Nov. 24, 1931.  E. O. HILLER  1,833,289
CONVEYER STRUCTURE
Filed March 22, 1928
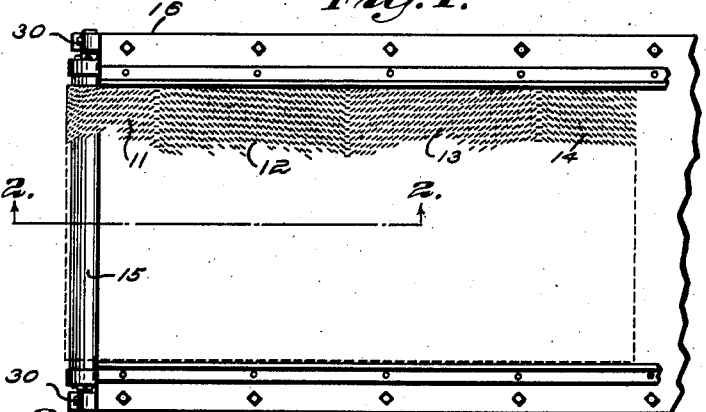
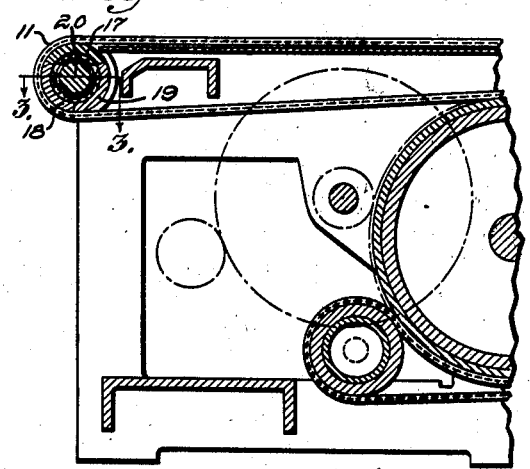
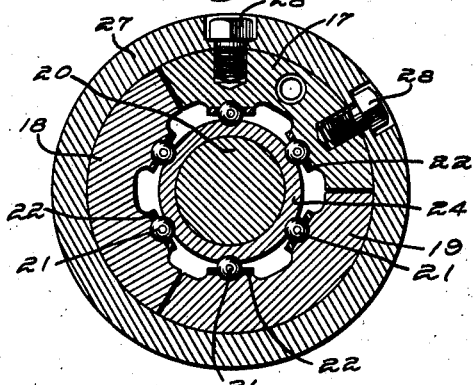
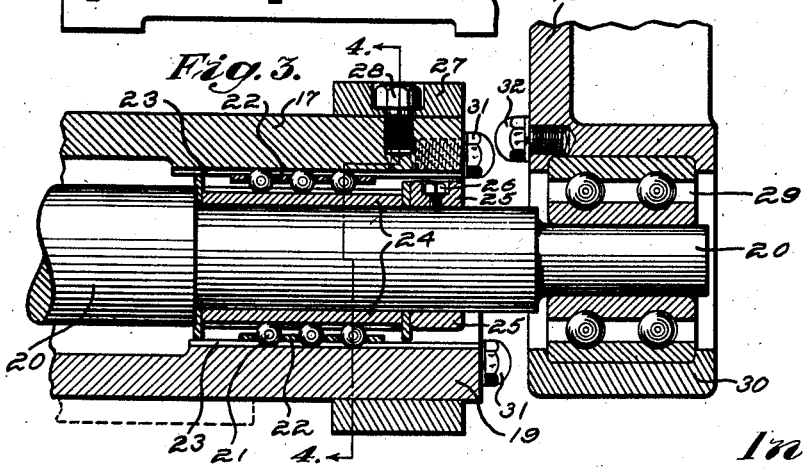
Witness:
Winslow B. Thayer.
Inventor:
Everett O. Hiller,
by Robson D Brown
Attorney Patented Nov. 24, 1931

1,833,289

UNITED STATES PATENT OFFICE

EVERETT O. HILLER, OF HARTFORD, CONNECTICUT, ASSIGNOR TO HARTFORD-EMPIRE COMPANY, OF HARTFORD, CONNECTICUT, A CORPORATION OF DELAWARE

CONVEYER STRUCTURE

Application filed March 22, 1928. Serial No. 263,680.

This invention relates to conveyers using woven wire belts, relating especially to such conveyers as may be used, for instance, in glassware annealing lehrs. Such belts are commonly constructed of woven wire material which is composed of interengaging helixes of wire, the loops of the wire joining with one another to form diagonal surface ribs.

When such a fabric is made into a conveyer belt, there is a marked tendency for the belt to creep laterally where it passes over a pulley, particularly a pulley of small diameter, such as may often be used at the end of a glassware annealing lehr. Attempts have been made to reduce this lateral shifting of the belt by making it in sections which are alternately woven from right handed helixes and left handed helixes, but even with belts made up of alternate sections, there is still some shifting causing friction first on one side then on the other of the lateral guides of the conveyer. A conveyer belt of this type, as used with a lehr, is described in U. S. Patent No. 1,583,046, granted May 4, 1926, to the Hartford-Empire Company, as assignee of Henry W. Ingle.

This invention proposes to overcome this shifting by providing a pulley capable of axial movement so that the relative lateral strain produced between the conveyer and the pulley will result in an endwise movement of the pulley instead of a sidewise movement of the conveyer. In order to more clearly explain the invention, there is shown one embodiment thereof in the accompanying drawings, in which:

Figure 1 is a plan view of a woven wire conveyer for a lehr;

Fig. 2 is a sectional elevation taken on the line 2—2 of Fig. 1;

Fig. 3 is a sectional view of a portion of the idler pulley taken on the line 3—3 of Fig. 2, and Fig. 4 is a transverse section of the idler pulley taken on the line 4—4 of Fig. 3.

In Fig. 1, the numerals 11, 12, 13 and 14 indicate sections of a woven wire conveyer belt having alternate right-handed and left-handed helixes. The section 11 is shown passing over an idler puley 15 carried by a frame 16. This pulley is divided into a plurality of sections, three as shown, 17, 18 and 19, along radial planes (see Fig. 4). This pulley or sleeve, as divided into sections, is carried by the arbor 20, and each section is independently longitudinally movable thereon, anti-friction means (such as ball bearings 21) being provided to facilitate this longitudinal movement. The balls are held in place by ball bearing cages 22 and run in grooves 23 in the sections 17, 18 and 19 and on a sleeve 24 carried by the arbor 20. These parts are held from longitudinal displacement by a collar 25 fastened to the arbor 20 by a set screw 26. The sections 17, 18 and 19 are held in place against the arbor 20 by collars 27 (one at each end of the arbor), set screws 28 fastening the collars to one of the sections, as 17.

To provide free rotation for the arbor, a ball bearing 29 complete with inner and outer races may be provided, and may be held in place by a bearing cap 30 carried by the frame 16.

Each section is provided with cams, at least one at each end, which, as shown, are merely studs 31 and these cooperate with stationary studs 32 carried by the frame 16.

In operation, the pull of the belt against the pulley or a section thereof moves that section longitudinally, but permits the belt itself to run in the middle position without displacement. During that part of each revolution during which the belt is disengaged from a section, the studs 32 cooperate with the cams 31 and move that section back to its middle or neutral position. As the wrap of the belt is usually 180° or slightly more, to construct the pulley in two sections only, instead of three, would result in each section always being engaged by the belt at least part of the time, and consequently there would be no period of time in which the section would be free to return to the neutral position. By making the pulley in three or more sections, as shown, each arc of 120° will generally be less than that part of the pulley not engaged by the belt, and for a definite interval each section is wholly out of engagement with the belt and free to be pushed back into its neutral position by means of cams 31 and studs 32.

While one specific means for carrying out the invention has been shown and described, it is obvious that various modifications may be made therein without departing from the spirit of the invention as defined in the subjoined claims.

I claim:

1. For a conveyer belt, a pulley comprising a plurality of sections divided along radial planes, each section being independently movable longitudinally under the side thrust of the belt, and means for bringing each section back to its neutral position during disengagement from the belt.

2. For a conveyer belt, a pulley comprising a plurality of sections, each section having a belt engaging surface, the arc of which is sufficiently small so that said section is disengaged from the belt a part of each revolution, said sections being independently movable longitudinally, cams at the ends of each section, and stationary studs cooperating with said cams for bringing each section back to its neutral position during disengagement from the belt.

3. For a conveyer belt, a pulley comprising a plurality of sections, each section having a belt engaging surface, the arc of which is sufficiently small so that said section is disengaged from the belt a part of each revolution, said sections being independently movable longitudinally, anti-friction means for said longitudinal movement, cams at the ends of each section, and stationary means cooperating with said cams for bringing each section back to its neutral position during disengagement from the belt.

4. For a woven wire conveyer, a pulley comprising a freely rotating arbor, a sleeve mounted on said arbor divided into a plurality of sections along radial planes, each section being independently movable longitudinally on said arbor, ball bearings for decreasing the friction of said longitudinal movement, collars around the sections for holding them in place, cams on the ends of said sections, and stationary studs for cooperating with said cams.

Signed at Hartford, Connecticut, this 17th day of March, 1928.

EVERETT O. HILLER.